(12) United States Patent
Fujita

(10) Patent No.: US 8,356,921 B2
(45) Date of Patent: Jan. 22, 2013

(54) LIGHTING DEVICE AND DOOR LINING USING SAME

(75) Inventor: Yusuke Fujita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 88 days.

(21) Appl. No.: 13/063,262

(22) PCT Filed: Sep. 16, 2009

(86) PCT No.: PCT/JP2009/066145
§ 371 (c)(1),
(2), (4) Date: Mar. 10, 2011

(87) PCT Pub. No.: WO2010/032746
PCT Pub. Date: Mar. 25, 2010

(65) Prior Publication Data
US 2011/0170304 A1 Jul. 14, 2011

(30) Foreign Application Priority Data

Sep. 19, 2008 (JP) .................. 2008-241257

(51) Int. Cl.
*B60Q 1/26* (2006.01)

(52) U.S. Cl. .......... 362/501; 362/511; 362/488

(58) Field of Classification Search .......... 362/501, 362/488, 551, 511
See application file for complete search history.

(56) References Cited

U.S. PATENT DOCUMENTS

| | | | |
|---|---|---|---|
| 5,365,412 A * | 11/1994 | Koppolu et al. | 362/518 |
| 5,678,914 A * | 10/1997 | Dealey et al. | 362/551 |
| 5,680,496 A | 10/1997 | Burkitt, III et al. | |
| 6,304,702 B1 | 10/2001 | Potucek et al. | |
| 7,210,829 B2 | 5/2007 | Okazaki et | |
| 7,213,952 B2 * | 5/2007 | Iwai | 362/488 |
| 7,946,742 B2 * | 5/2011 | Iwai et al. | 362/488 |
| 2006/0290647 A1 | 12/2006 | Oron et al. | |

FOREIGN PATENT DOCUMENTS

| | | |
|---|---|---|
| DE | 101 10 303 A1 | 9/2002 |
| DE | 101 15 378 A1 | 1/2003 |
| EP | 1 110 822 A2 | 6/2001 |
| EP | 1 625 971 A2 | 2/2006 |
| JP | 6-22082 U | 3/1994 |
| JP | 7-5922 U | 1/1995 |
| JP | 07-006610 A | 1/1995 |
| JP | 08-318783 A | 12/1996 |
| JP | 2000-177482 A | 6/2000 |
| JP | 2002-367403 A | 12/2002 |
| JP | 2005-019154 A | 1/2005 |
| JP | 2006-103373 A | 4/2006 |
| WO | 97/18105 A1 | 5/1997 |

* cited by examiner

*Primary Examiner* — Ali Alavi
(74) *Attorney, Agent, or Firm* — Carrier Blackman & Associates, P.C.; Joseph P. Carrier; William D. Blackman

(57) ABSTRACT

A lighting device for use in a vehicle, is equipped with one light source and a linear light-guiding body which guides light from the light source. The light-guiding body has a linear, primary spotlight part which emits light in a linear shape and a secondary spotlight part which emits a spot of light from the tip of the light-guiding body, thus providing different lighting with one light source.

9 Claims, 11 Drawing Sheets

LIGHTING DEVICE AND DOOR LINING USING SAME

TECHNICAL FIELD

The present invention relates to an illumination device (also referred to as a lighting device) and to a door lining that uses the illumination device.

BACKGROUND ART

Patent Document 1 discloses a linear light emitter that is used in a vehicle and configured so that light from a light source is emitted from the periphery of a rod-shaped body.

Patent Document 2 discloses another illumination device that is disposed in a passenger compartment and configured so that light from a light source is branched into a plurality of branching light transmission paths via a light transmission path, and the brightness of the illumination is adjusted individually for a plurality of locations.

However, in the linear light emitter of Patent Document 1 and the vehicle illumination device of Patent Document 2, a linear light emitter or branching light transmission path (optical fiber) must be employed for each illuminated location. For example, in order to project light from three locations, three linear light emitters (light guides) or optical fibers (light guides) are provided, and the structure becomes complex.

Furthermore, when illumination is provided from two locations, for example, in order to vary the brightness between light and dark, or to create a large or small range of illumination according to the object to be illuminated, two types of linear light emitters or optical fibers corresponding to each type of illumination must be made, and cost reduction is difficult to achieve.

PRIOR ART LITERATURE

Patent Document

Patent Document 1: Japanese Patent Application Laid-Open Publication
Patent Document 2: Japanese Patent Application Laid-Open Publication No. 2005-19154

SUMMARY OF INVENTION

Technical Problem

An object of the present invention is to provide an illumination device that has one light source and one light guide, is simple in structure, and is capable of projecting light in different modes (brightness, range) to a plurality of areas, and imparting different illumination effects according to the function (button type (including layout), lever) of the illumination area, and to provide a door lining that uses the illumination device.

Solution to Problem

According to a first aspect of the present invention, there is provided an illumination device provided to an interior body of a vehicle, which device comprises: a light source, and a light guide for guiding light from the light source and projecting light within a vehicle cabin, the light guide having a linear main light projection part for projecting light in linear fashion, and a secondary light projection part for projecting light at a distance from the linear primary light projection part using light that has passed through the linear primary light projection part.

Preferably, the secondary light projection part is set to a smaller irradiation area than the linear primary light projection part, and is disposed farther away from the light source.

Preferably, the illumination device further comprises a first lens for transmitting light from the linear primary light projection part and projecting light in linear fashion, the first lens being disposed linearly along the longitudinal direction of the linear primary light projection part; and a second lens for transmitting light of the secondary light projection part, the second lens having a light projection range smaller than the light projection range of the first lens and being disposed in a concave part formed in the interior body.

Preferably, the linear primary light projection part is directed toward the point of view of a vehicle occupant, and the secondary light projection part is directed away from the point of view of the vehicle occupant.

Preferably, the first lens transmits and projects light toward an external periphery of the light guide, and the second lens transmits and projects light in the axial direction of the light guide.

According to another aspect of the present invention, there is provided a door lining comprising an illumination device having a linear main light projection part for projecting light in linear fashion, and a secondary light projection part for projecting light at a distance from the linear primary light projection part using light that has passed through the linear primary light projection part, a light guide being provided for guiding light from a light source and projecting light within a vehicle cabin; a switch panel disposed in the vicinity of the linear primary light projection part and provided with a plurality of operating switches; and an operating member disposed in the vicinity of the secondary light projection part and provided with at least one operating part.

Preferably, the light guide is fastened in the vicinity of a connection end of the switch panel by the first lens for transmitting light from the linear primary light projection part and projecting light in linear fashion, the first lens being disposed linearly along the longitudinal direction of the linear primary light projection part.

Advantageous Effects of Invention

In the illumination device of the present invention, since the light guide has a linear primary light projection part for projecting light in linear fashion along the interior material, and a secondary light projection part for projecting light at a distance from the linear primary light projection part using light that has passed through the linear primary light projection part, light can be projected in a different mode from each of the linear primary light projection part and the secondary light projection part. Consequently, different illumination effects can be created by a single light guide according to the function of the illumination area (whether provided in a relatively wide range or in a pinpointed area).

Since the secondary light projection part is set to a smaller illumination area than the linear primary light projection part, and the secondary light projection part is set at a long distance from the light source, the linear primary light projection part can emit light linearly along the interior body and uniformly illuminate a specific area, whereas the secondary light projection part can uniformly illuminate a small specific area. In other words, discomfort due to inadequate light intensity can be reduced even though the secondary light projection part is far from the light source, and the illumination device has the advantage of being capable of illuminating separate areas without being provided with additional illumination means. Furthermore, the effect of the secondary light projection part can be weakened, and the visual effect of the linear primary light projection part can be further emphasized.

The first lens for linear light projection, and the second lens having a small range of light projection make it possible to obtain more appropriate light intensities for the illumination area of the linear primary light projection part and the illumination area of the secondary light projection part. As a result, different modes of illumination can be obtained.

The linear light emission area formed by the linear primary light projection part can be made more noticeable to effectively demonstrate visual effects to the vehicle occupants, and discomfort due to difference in light intensity can be even further reduced by spot-illuminating the illumination area formed by the secondary light projection part in a less conspicuous manner. For example, weakening the secondary light projection part enables discomfort to be further reduced, and, conversely, strengthening the secondary light projection part cancels out the discomfort and enables a nearly uniform impression to be imparted.

Light that has weakened in intensity in the linear light emission area can be effectively utilized by the second lens forming a small light projection range. For example, when light is projected to an intended location, the layout of the second lens with respect to the light guide is facilitated, ultimately making it possible to enhance the degree of freedom of the illumination layout.

The door lining of the present invention makes it possible to enhance operating properties without providing a plurality of illuminations for a plurality of operating switches, and the positions of controls can also be suitably seen when operating members other than operating switches are operated.

Since the light guide is fastened in the vicinity of the connection end of the switch panel by the first lens, the light guide is easily retained by using the first lens to retain the light guide. The connection end of the switch panel is also appropriately positioned with respect to the first lens.

DESCRIPTION OF EMBODIMENTS

Preferred embodiments of the present invention are described below with reference to the accompanying drawings.

Figure 1:
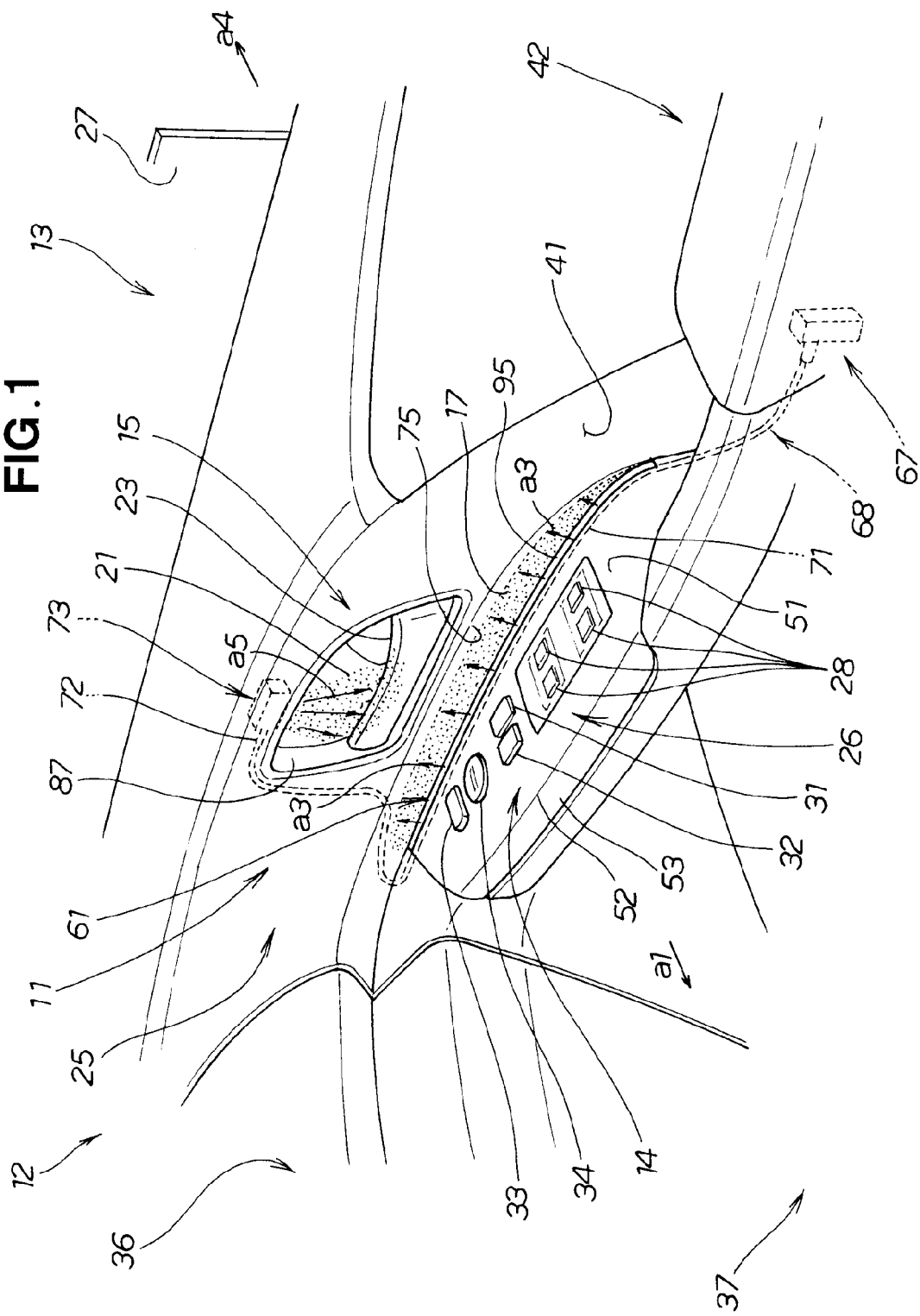
FIG. 1 is a schematic view showing an illumination device according to the present invention, as applied to a vehicle door lining.

The illumination device 11 (also referred to as a lighting device 11) shown in FIG. 1 constantly illuminates an operating member (inner handle) 15 and a switch panel 14 provided to a door 13 of a vehicle 12. A detailed description will be given hereinafter, but the switch panel 14 is indirectly illuminated by indirect light radiated to a relatively wide-ranging illumination area 17 (the range of which is indicated by a dot pattern), and the inner handle 15 is directly illuminated by direct light radiated to a relatively narrow-ranged illumination area 21 (the range of which is indicated by a dot pattern).

The inner handle 15 is an existing structure provided with an operating part (door handle body) 23 that is grasped in order to open the right front door 13. As is a commonly encountered configuration, the right front door 13 opens when the door handle body 23 is grasped and pulled.

The switch panel 14 is attached to an interior member (door lining) 25 of the door 13, and is provided with operating switches 26. The operating switches 26 have a window opening and closing switch 28 for opening and closing a window glass 27, a door lock switch 31, a window lock switch 32, a mirror selection switch 33, and a mirror adjustment switch 34. The reference numeral 36 refers to an instrument panel, and 37 refers to a vehicle cabin.

Figure 2:
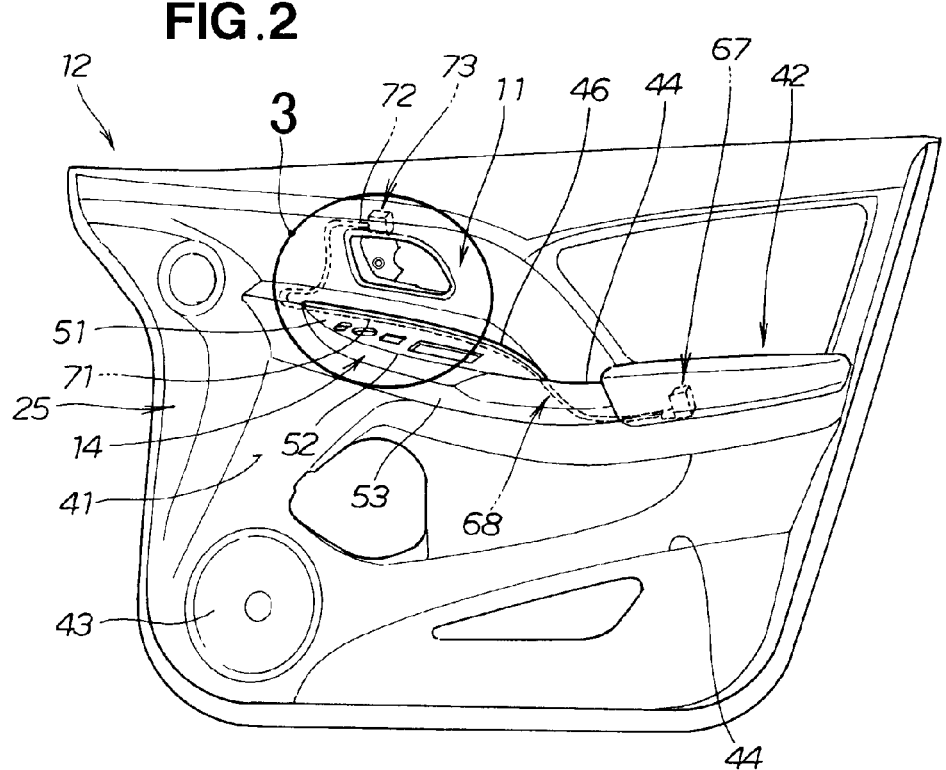
FIG. 2 is schematic view showing the door lining of FIG. 1.
Figure 3:
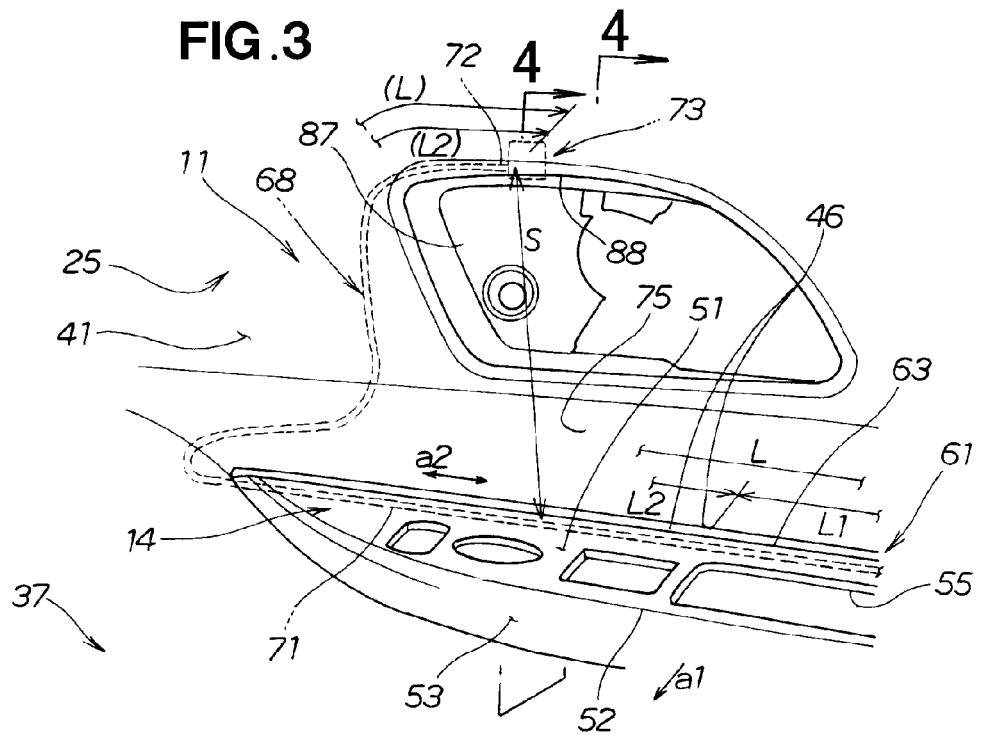
FIG. 3 is an enlarged view showing an area encircled by 3 of FIG. 2.

FIGS. 2 and 3 show a state in which the switches and inner handle 15 of the switch panel 14 are not attached. The following description will reference FIG. 1.

The door lining 25 forms the lining (side wall) of the door 13, and the switch panel (second member) 14, inner handle 15, a driver's armrest 42, a speaker 43, and an accessory case 44 are provided to a door lining body (first member) 41 made of resin.

The door lining 25 has a dividing line 46 between the door lining body 41 and the switch panel (second member) 14. The dividing line 46 is a connection line formed by contact between the door lining body 41 and the switch panel 14, the door lining 25 being the main body.

The switch panel 14 protrudes from the door lining body 41 toward the center of the vehicle cabin 37 (in the direction of arrow a1). The switches are arranged on the top surface 51 of the switch panel 14. A side surface 53 is formed continuously with a protruding distal end 52 of the top surface 51. A light-shielding partition 62 (see FIG. 4) for blocking the light from the first lens 61 overhangs along the first lens 61 of the illumination member 11 on a back surface 55 of the top surface 51. A connection end 63 of the top surface 51 is connected to the door lining body 41 across the first lens 61.

The door 13 shown in the drawings is a right front door, but the left front door not shown in the drawings is substantially the same as the right front door 13, except from the layout of the switch panel 14.

The illumination device 11 is provided to the door lining 25 of the vehicle 12, the illumination device 11 projects light into the vehicle cabin 37 from the door lining 25, and the illumination device 11 is provided with a light guide 68 for guiding the light from a light source 67. The light guide 68 is provided with a linear main light projection part 71 (in the direction of arrows a3) for projecting light in linear fashion (in the direction of arrow a2) along the door lining 25, and a secondary light projection part 72 for projecting light at a distance from the linear primary light projection part 71 using light guided by the linear primary light projection part 71. The reference numeral 73 refers to a second lens.

Figure 4:
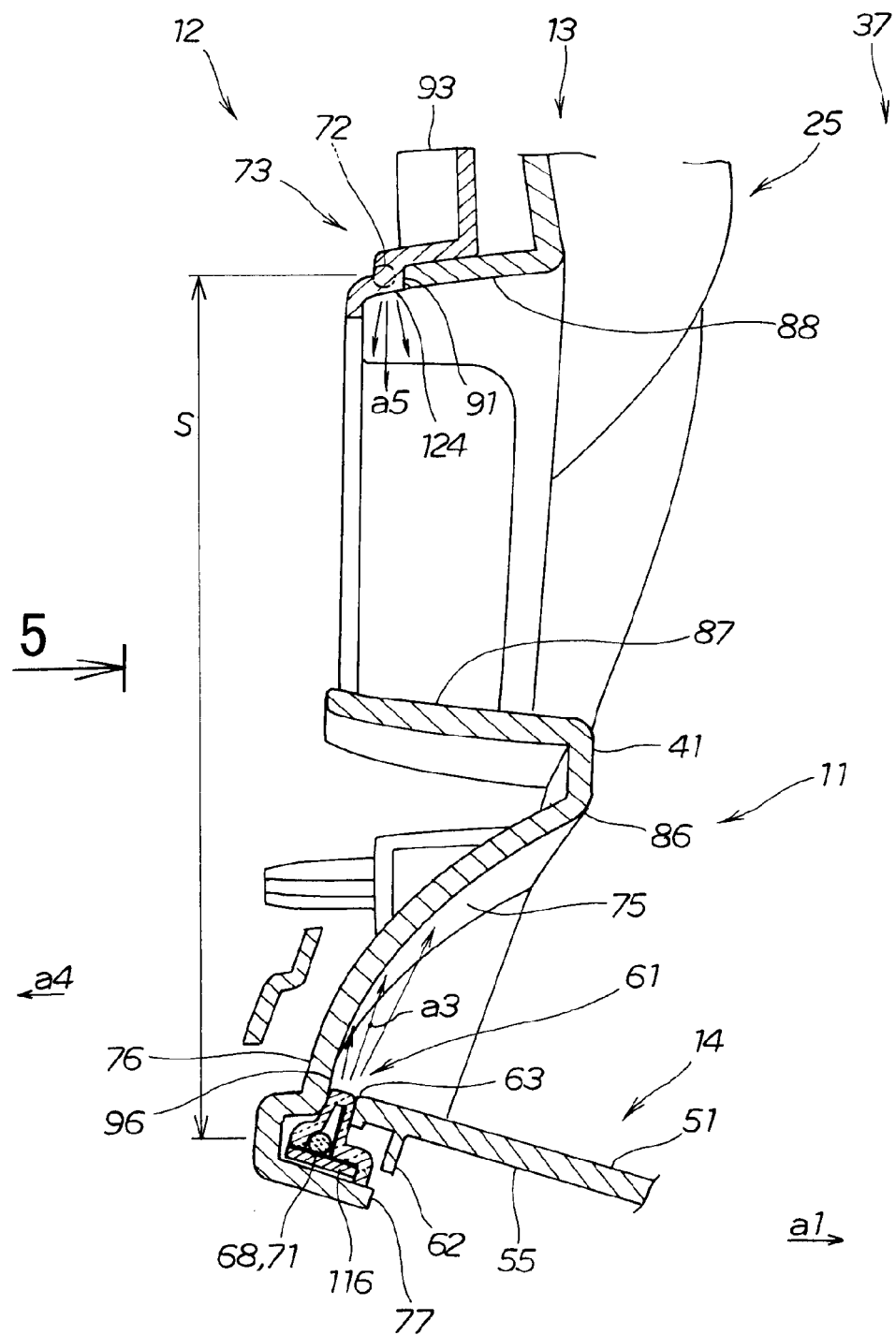
FIG. 4 is a sectional view taken along line 4-4 of FIG. 3.
Figure 5:
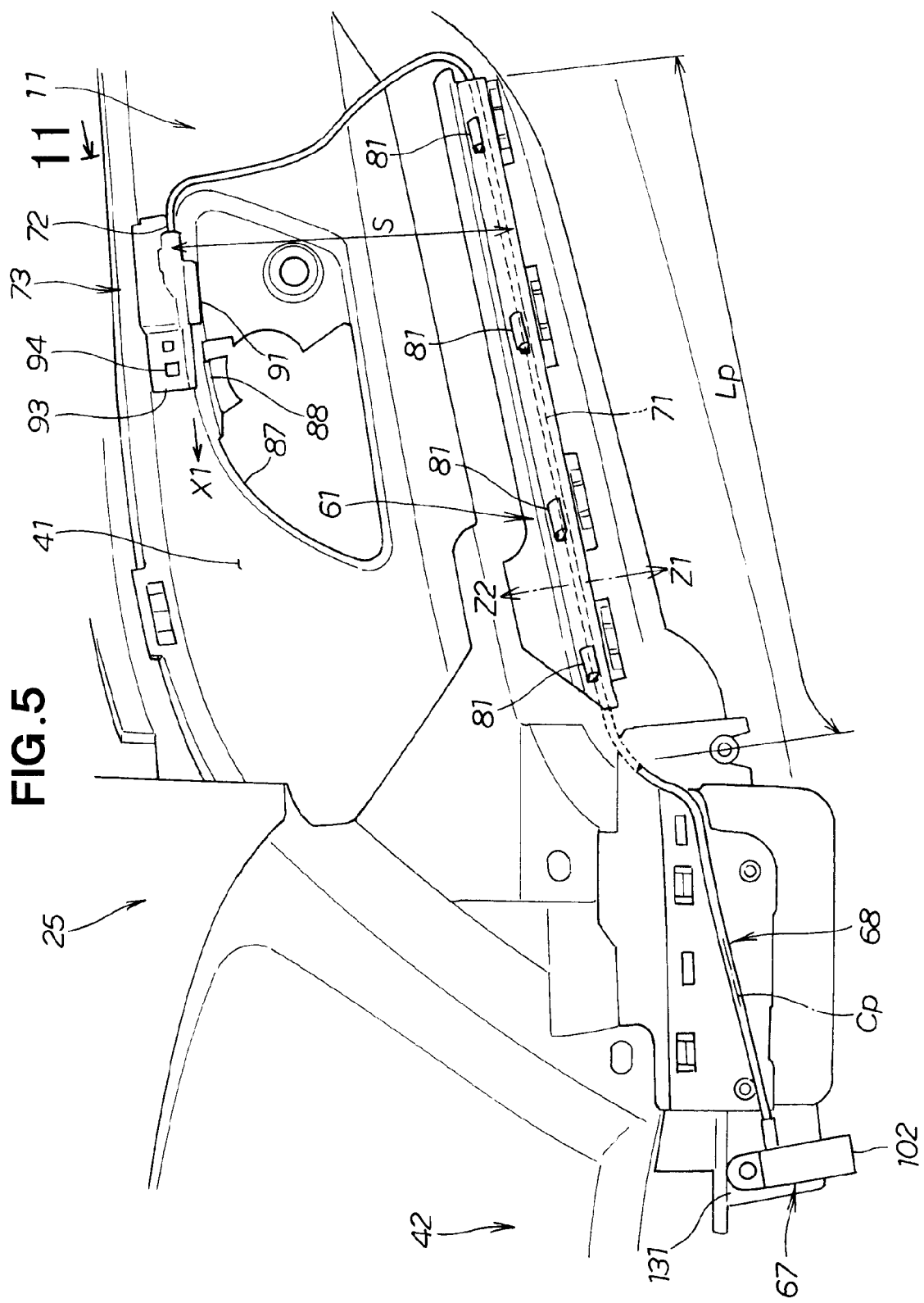
FIG. 5 is a view as seen in the direction of arrow 5 of FIG. 4.

The length of the linear main light projection part 71 is approximately Lp (see FIG. 5). The distance referred to by "at a distance" is the distance S (see FIGS. 4 and 5) to the secondary light projection part 72 from a reference point at the center of the length Lp of the linear main light projection part 71. The distance S is arbitrary according to conditions.

The secondary light projection part 72 is set to a smaller irradiation area 21 than the linear primary light projection part 71, and is disposed farther away from the light source 67. Specifically, in the light guide 68 of total length L (L=L1+L2), the distance (length) from the light source 67 to the secondary light projection part 72 is L (total length), and the secondary light projection part 72 is at a distance L2, as opposed to the distance L1 from the light source 67 to the end of the linear main light projection part 71.

Figure 8:
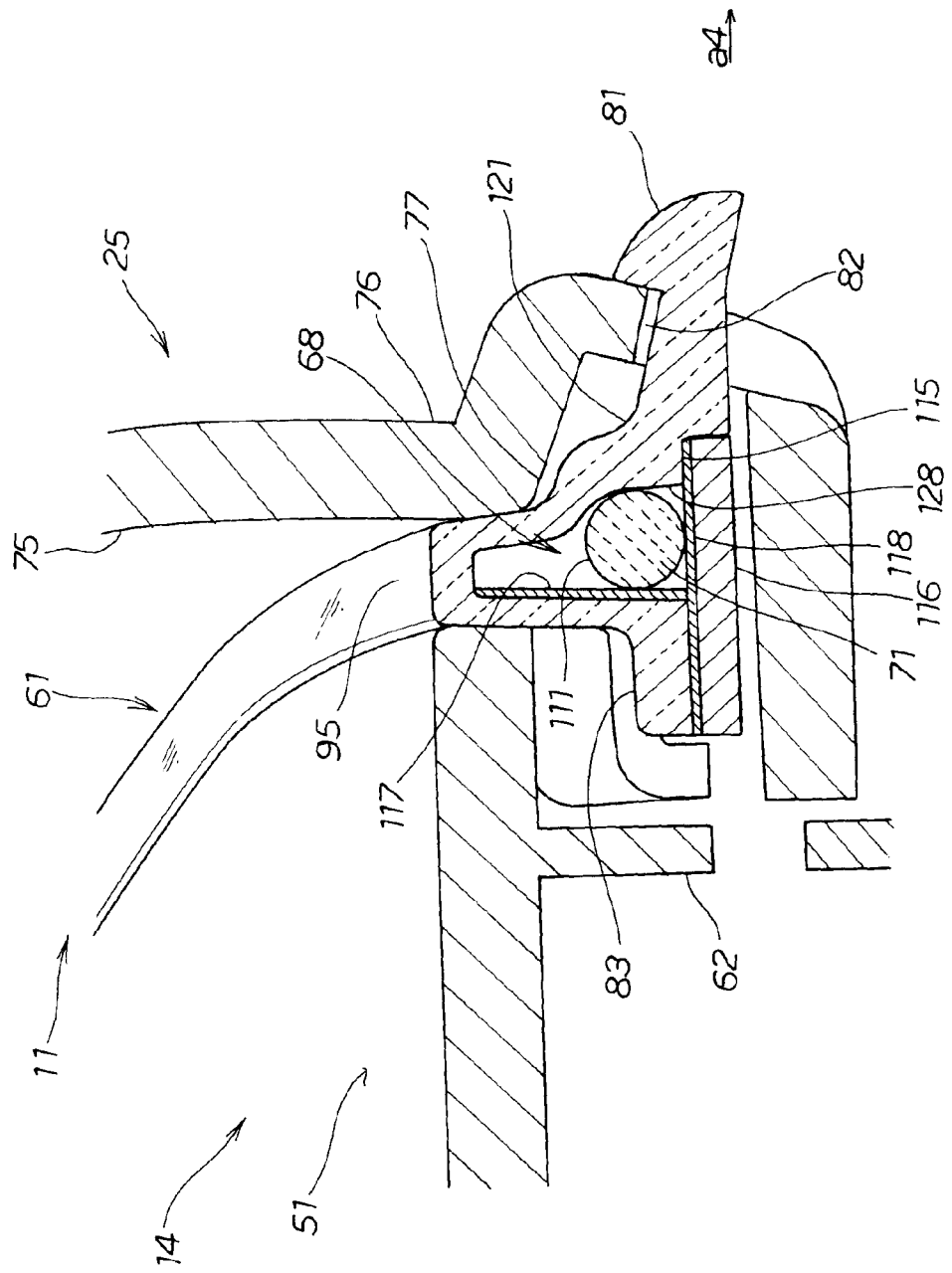
FIG. 8 is a cross-sectional view showing the first lens attached to the door lining.
Figure 9:
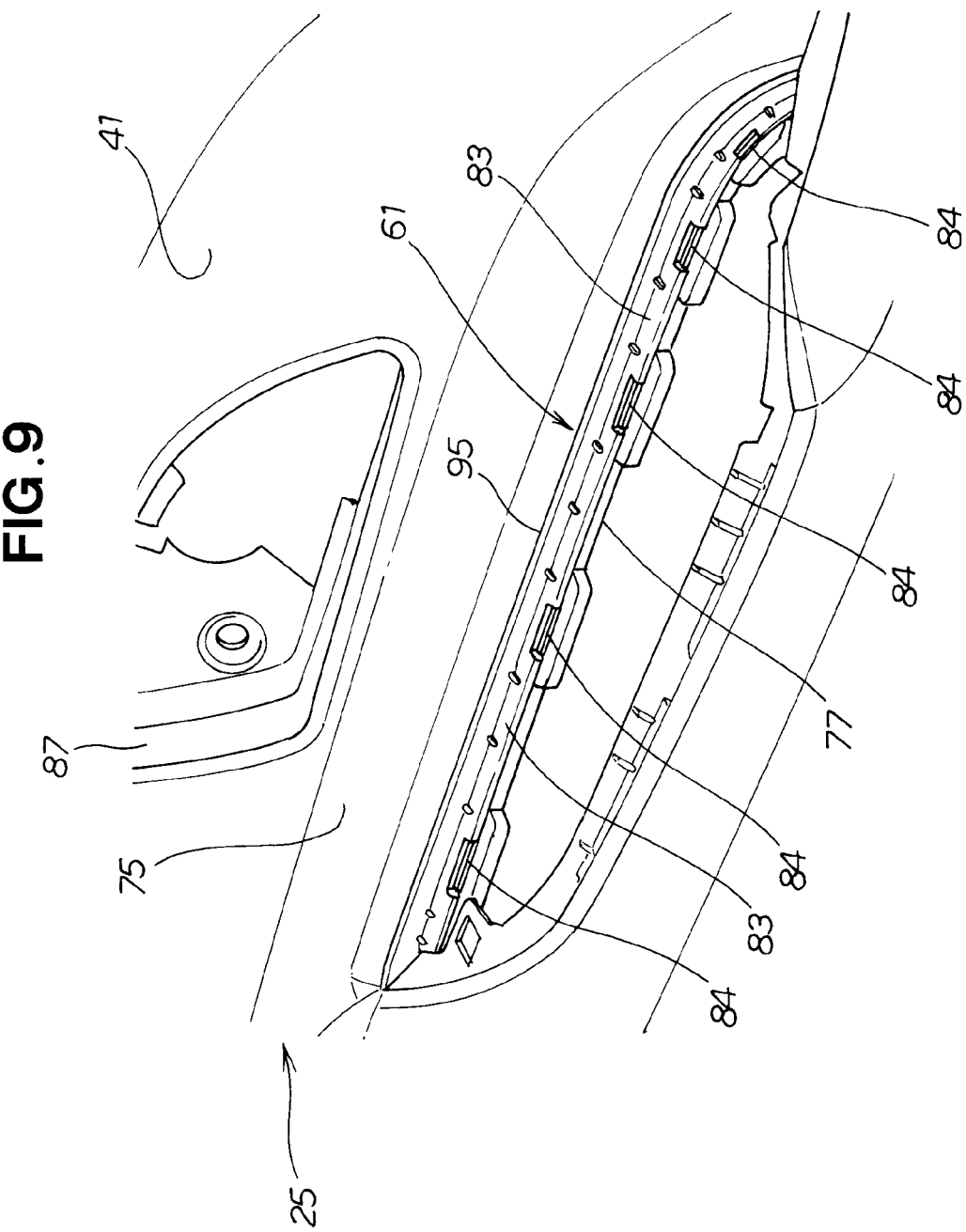
FIG. 9 is a perspective view showing a state of attachment of the first lens.

As shown in FIGS. 1 through 5 and 8 through 10, the armrest 42 (FIGS. 1 and 2) is formed in a convex shape toward the vehicle occupant (in the direction of arrow a1) at the center of the door lining body 41. An overhang 75 formed continuously with the armrest 42 overhangs toward the outside of the vehicle 12 (in the direction of arrow a4) so that the switch panel 14 is provided on a shelf. An opening 77 is formed continuously with a lower end 76 of the overhang 75, and the switch panel 14 is configured so as to be able to fit into the opening 77. As shown in FIG. 8, a claw-retaining through-hole 82 for engaging with retaining claws 81 of the first lens 61 is formed at a predetermined interval at the lower end 76 of the overhang 75 at the edge of the opening 77.

Figure 10:
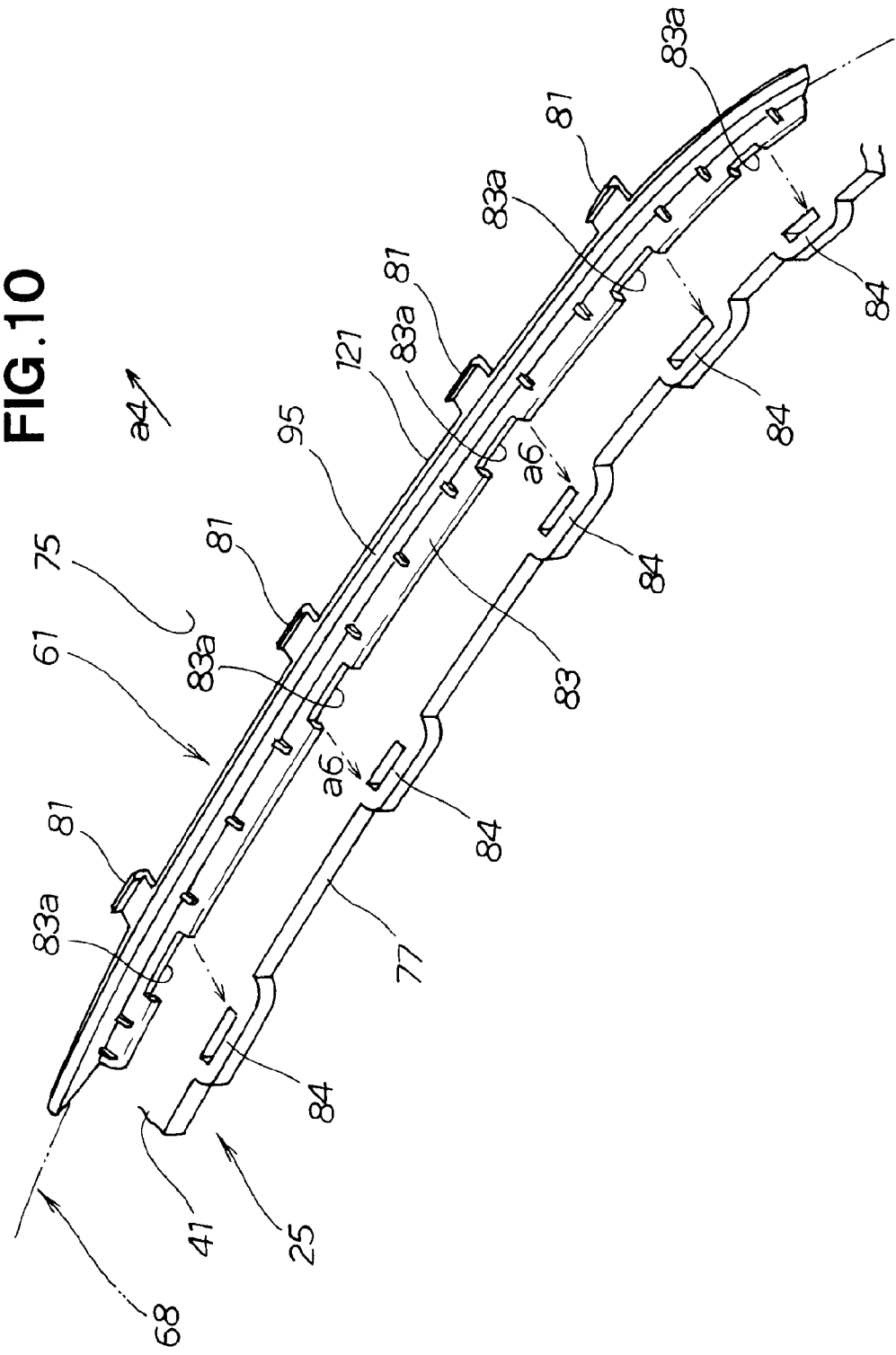
FIG. 10 is a perspective view showing the first lens.

A plurality of notches 83a is formed in a fitting flange 83 of the first lens 61 so as to correspond to switch panel fastening holes 84 for fastening the switch panel 14, as shown in FIG. 10. The switch panel 14 is attached to the door lining body 41 by engaging fastening tabs (not shown) of the switch panel 14 in the switch panel fastening holes 84. Since the notches 83a are formed so as to correspond to the vehicle-interior side of the retaining claws 81, the first lens 61 has a substantially uniform rigidity distribution in the length direction thereof.

As shown in FIG. 4, in order to provide the inner handle 15 to the top part that is continuous with an upper end 86 of the overhang 75, a tunnel part 87 that is open toward the outside of the vehicle 12 (in the direction of arrow a4) is formed, an illumination fitting opening 91 for fitting a second lens 73 is formed in a ceiling part 88 of the tunnel part 87, and a lens fixing part 94 (see FIG. 11) for attaching a bracket 93 of the second lens 73 is provided to the back of the ceiling part 88.

Figure 6:
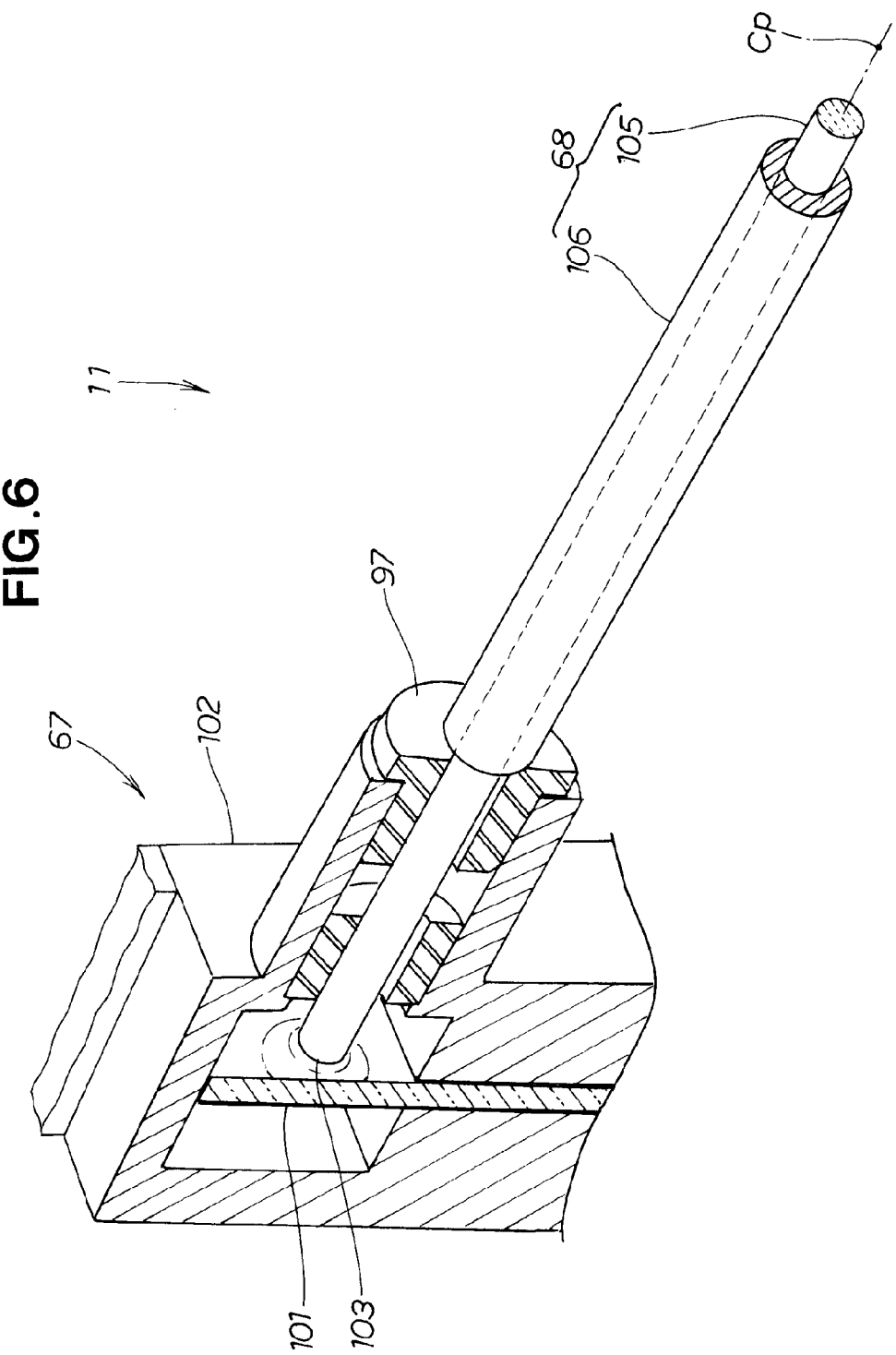
FIG. 6 is a perspective view showing a light source of the illumination member.
Figure 7:
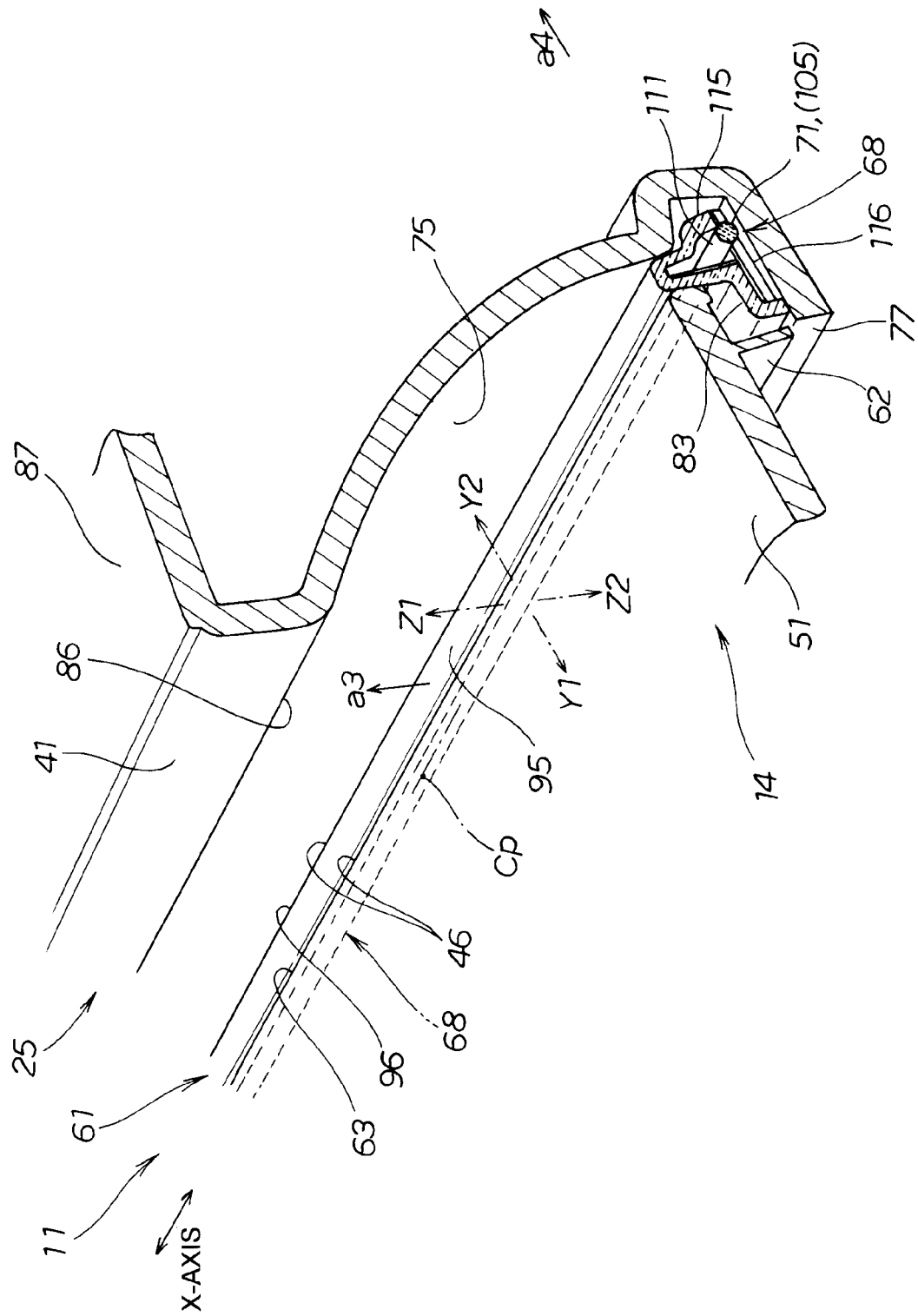
FIG. 7 is a perspective view showing a first lens assembled with a linear primary light projection part.

As shown in FIGS. 6 and 7, the axis line Cp of the light guide 68 is a line that passes through the center of the cross-section of the light guide 68 and is orthogonal to the cross-section of the light guide 68.

The illumination device 11 is provided with the first lens 61 for transmitting the linear light of the linear main light projection part 71 and forming a linear light projection (in the direction of arrows a3), the first lens 61 being disposed between the linear main light projection part 71 and the vehicle cabin 37; and the second lens 73 for transmitting the light of the secondary light projection part 72 and forming a light projection range 21 (FIG. 1) smaller than that of the first lens 61, the second lens 73 being disposed between the secondary light projection part 72 shown in FIG. 3 and the vehicle cabin 37, and disposed in the concave part (tunnel part) 87 formed in the interior member (door lining) 25.

As shown in FIG. 1, the linear main light projection part 71 is oriented toward the position of the eyes of a vehicle occupant not shown in the drawing (in the direction of arrows a3), and the secondary light projection part 72 is oriented in a direction away from the position of the eyes of the vehicle occupant (the direction of arrows a5). The term "vehicle occupant" refers to the driver or a person in the passenger seat.

The first lens 61 projects light to the outside (in the direction of arrows Y1, Y2, Z1, Z2 in FIG. 7) from the periphery of the light guide 68 (specifically, the linear main light projection part 71). The second lens 73 projects light (in the direction of arrows a5) in the axial direction (the direction of arrow X1 in FIG. 12) of the light guide 68.

As shown in FIG. 1, the door lining 25 has the switch panel 14 disposed in the vicinity of the linear main light projection part 71 and provided with the switches 28 and 31 through 33 that constitute the operating switches 26, and the inner handle 15 disposed in the vicinity of the secondary light projection part 72 and provided with at least a single door handle body 23. In the door lining 25, the light guide 68 is secured in the vicinity of the connection end 63 (FIG. 4) of the switch panel 14 by the first lens 61.

The interior member 25 is described as being a door lining, but the instrument panel 36, a center console (not shown) provided between the left and right front seats, or a roof ceiling interior can be cited as interior members other than the door lining.

As shown in FIGS. 1, 2, 4, and 6, the illumination member 11 is provided with the light source 67, the light guide 68, a light guide connecting member 97 connected to the light source 67, the first lens 61, the second lens 73, and an on/off switch unit (not shown). For example, when the right front door 13 is opened, and an engine start switch is turned on, the light source 67 is made to emit light through the operation of the on/off switch and illuminates the locations shown in FIG. 1.

An LED light emitter 101 is used for the light source 67, and the specific specifications of the LED light emitter 101 are arbitrary. The LED light emitter 101 is covered by a case 102. An input end 103 of the light guide 68 is connected to the case 102 using the light guide connecting member 97 so that the center of the LED light emitter 101 and the axis line Cp of the input end 103 substantially match each other.

The light guide 68 has a transparent body 105 made of resin, a guide sheath 106 for covering the transparent body 105, the linear main light projection part 71 from which a length Lp (FIG. 5) of the guide sheath 106 is peeled off, and the secondary light projection part 72 that includes an output end 107 (FIG. 12) of the light guide 68. The linear main light projection part 71 is closer to the LED light emitter 101 than the secondary light projection part 72, and is therefore brighter than the secondary light projection part 72. A single transparent body 105 is described as being provided, but a plurality of transparent bodies 105 may also be provided in a bundle as thick as the transparent body 105 shown in the drawings.

As shown in FIGS. 7 through 10, the linear main light projection part 71 is the transparent body 105 having a range that substantially coincides with the entire length of the first lens 61, and is a part from which the guide sheath 106 shown in FIG. 6 is separated. Light is emitted from a peripheral surface 111 of the linear main light projection part 71 (transparent body 105). In other words, the linear main light projection part 71 is configured so that light escapes from the peripheral surface 111.

The first lens 61 is a transparent component made of resin in an elongated hollow shape. The lens has a projection part 95 having directivity for projecting the light from the interior linear main light projection part 71 in one direction (direction indicated by arrows a3, see also FIG. 1), the fitting flange 83 and retaining claws 81 secured to the door lining 25 and formed continuously with the light projection part 95, a seal member 116 attached to the fitting flange 83 and an edge part 115, and reflectors 117, 118 provided as needed.

The light projection part 95 forms indirect light for illuminating the relatively wide illumination area 17 (FIG. 1) described previously, and indirectly illuminates the switch panel 14.

The retaining claws 81 are formed along an edge 121 continuous with the light projection part 95 so as to extend toward the outside (in the direction of arrow a4) of the vehicle 12, and are formed so as to be pushed (in the direction of arrow a4) by engaging with the switch panel fastening holes 84 of the door lining body 41 when the fitting flange 83 is pushed down from above as indicated by arrow a6 (FIG. 10). Therefore, when the retaining claws 81 are inserted toward the door lining body 41, the first lens 61 can be attached, and attachment of the first lens 61 is easily accomplished.

Figure 11:
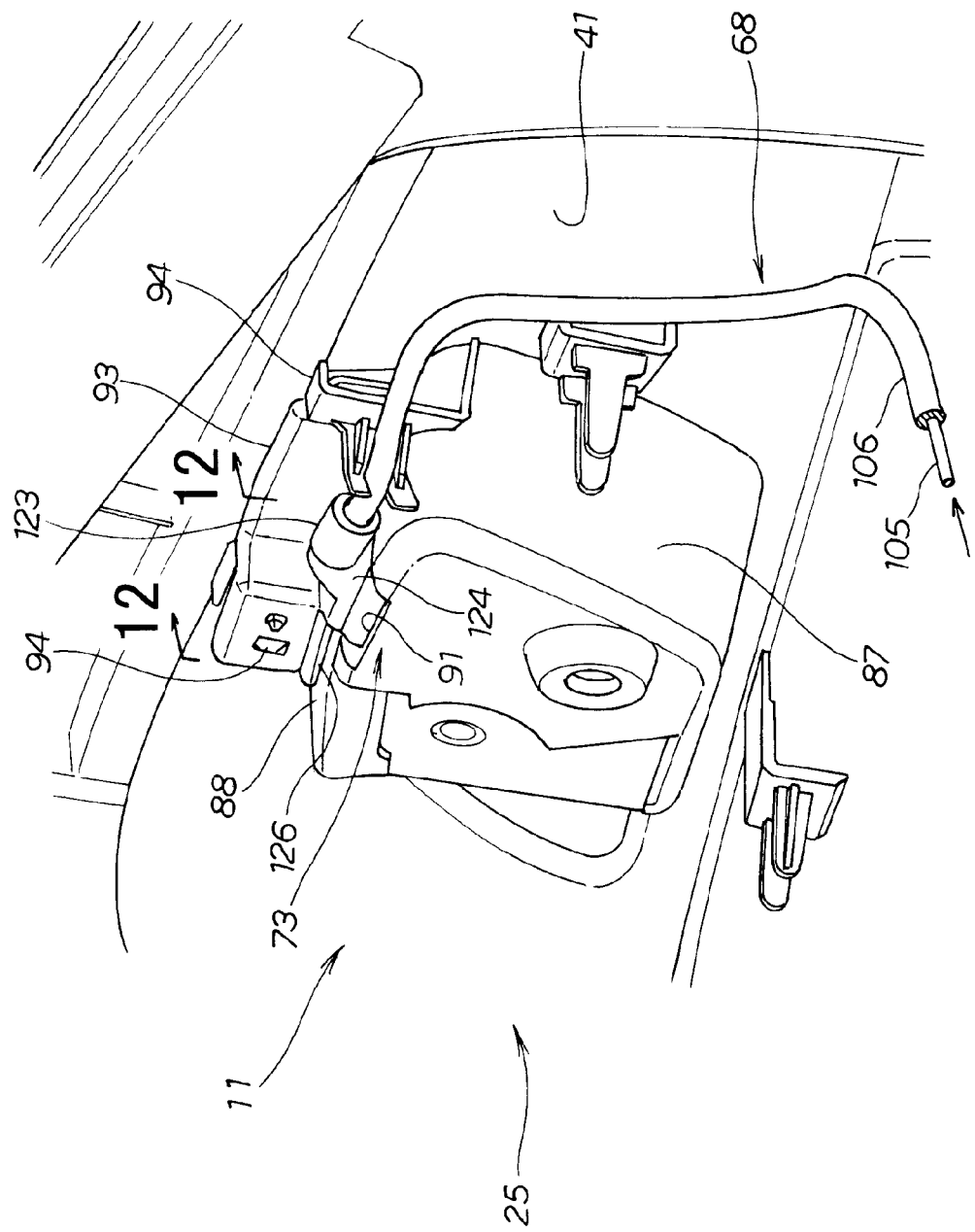
FIG. 11 is a view as seen in the direction of arrow 11 of FIG. 5.
Figure 12:
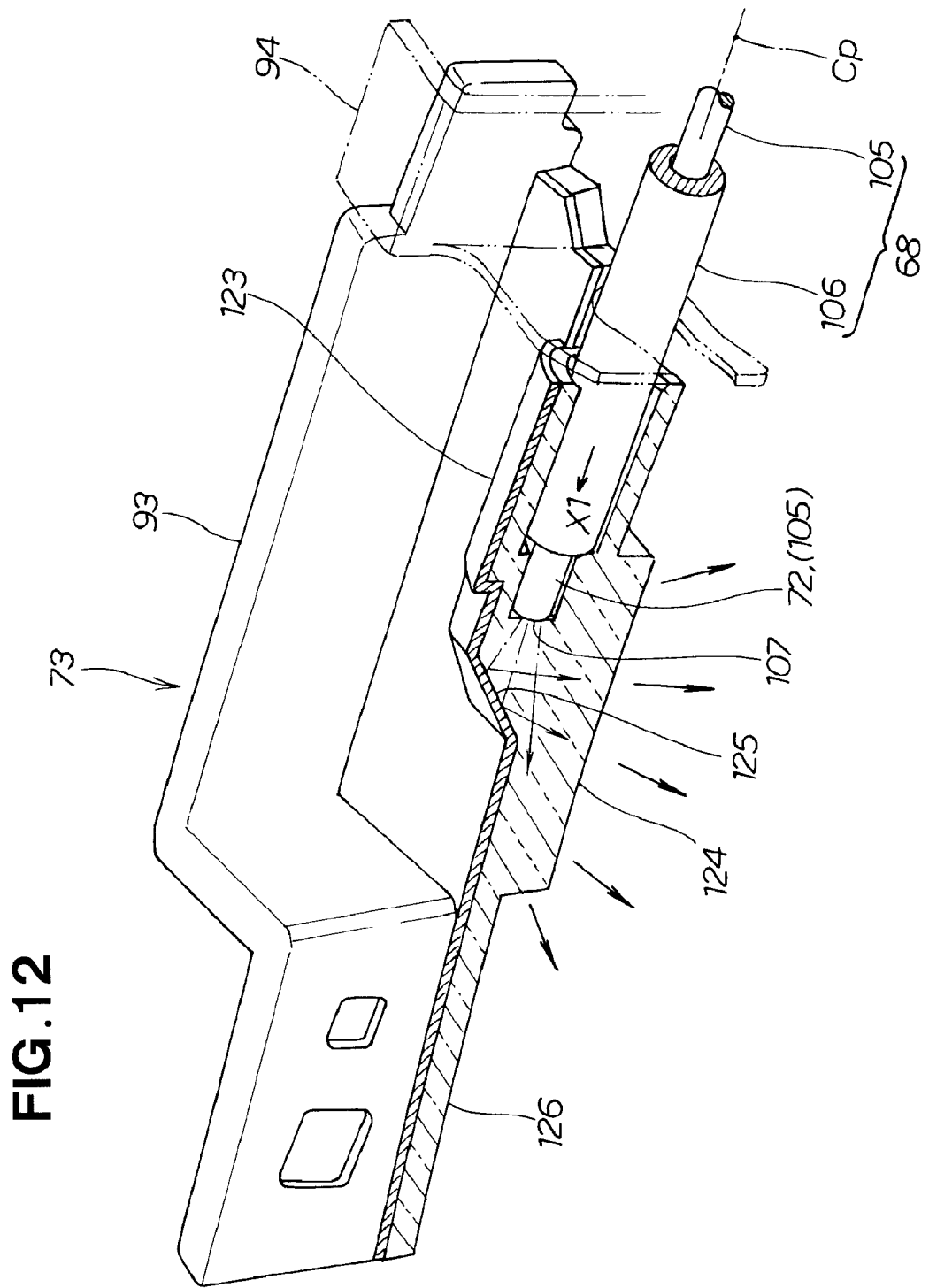
FIG. 12 is a sectional view taken along line 12-12 of FIG. 11.

As shown in FIGS. 11 and 12, in the second lens 73, an output end connector 123 for connecting the output end 107 of the light guide 68 is formed; a lens body 124 is formed continuously with the output end connector 123 so as to illuminate a relatively narrow range, i.e., to provide pinpoint illumination (irradiation area 21 of FIG. 1); a reflector 125 is provided to the lens body 124; a pressing flange 126 is formed in the lens body 124 so as to press against the back of the ceiling part 88 of the door lining 25; and the bracket 93 is provided to the pressing flange 126.

In the second lens 73, the lens body 124 is fitted in the illumination fitting opening 91 of the door lining 25, and when the bracket 93 is fitted with the lens fixing part 94 provided to the back of the concave part (tunnel part) 87, the pressing flange 126 can be superposed on and pressed against the back of the concave part (tunnel part) 87, and the lens body 124 can be fixed in place. In other words, assembly of the second lens 73 is facilitated.

Assembly of the illumination device 11 of the present invention will next be briefly described.

The light guide 68 is first completed. The transparent body 105 is covered by the guide sheath 106 with the exception of the input end 103 of the transparent body 105, the linear main light projection part 71, and the secondary light projection part 72 (output end 107).

Assembly of the individual illumination device 11 is then completed. As shown in FIG. 6, the input end 103 of the light guide 68 is connected to the case 102 that houses the light source 67, the second lens 73 is fitted with the secondary light projection part 72 (output end 107) of the light guide 68, and the linear main light projection part 71 is provided inside an opening 128 (FIG. 8) of the first lens 61 and fixed in place by the seal member 116.

The separately assembled illumination device 11 is then attached to the door 13. The case 102 of the light source 67 is attached to a light source receptacle 131 (FIG. 4) formed in the door lining body 41, the retaining claws 81 of the first lens 61 are inserted into the door lining body 41 and thereby fastened, and assembly of the first lens 61 is almost completed.

The switch panel 14 is then fitted in the door lining body 41, whereby the light projection part 95 of the first lens 61 is held by the connection end 63 of the switch panel 14 and a connection end 96 of the door lining body 41, and the first lens 61 is thereby fixed in place. Assembly of the first lens 61 is thereby completed.

In the step of attaching the switch panel 14, an advantage is gained in that the connection end 63 of the switch panel 14 is appropriately positioned with respect to the first lens 61 that has already been fixed to the door lining body 41.

Lastly, the second lens 73 is attached to the concave part (tunnel part) 87 formed in the door lining body 41, and assembly of the illumination device 11 is completed. The switches are attached to the switch panel 14 in advance.

The operation of the illumination device 11 and door lining 25 that uses the illumination device 11 of the present invention will next be described.

Again referencing FIGS. 1, 5, and 6, linear illumination is provided by the linear main light projection part 71, and spot illumination is provided by the secondary light projection part 72. This can be achieved by causing light to be emitted by the light source 67 through only a single light guide 68 in the illumination device 11.

Specifically, when the light source 67 emits light, the light enters the light guide 68 from the input end 103 of the transparent body 105, and is directed by the transparent body 105 and the guide sheath 106 and diffused by the linear main light projection part 71 into the surrounding area from the surface of the transparent body 105. The light is therefore directed upward from the light projection part 95 of the first lens 61 and projected. As a result, the overhang 75 is directly illuminated in linear fashion and in a wide range in the manner indicated by arrows a3, as described with reference to FIG. 1. Illumination can be provided by the indirect light as indicated by arrows a4, and the switches of the switch panel 14, for example, can be illuminated.

The non-diffused light from the linear main light projection part 71 travels through the transparent body 105, is diffused by the secondary light projection part 72 (output end 107), and is directed downward from the secondary light projection part 72 of the second lens 73 through the second lens 73 and projected to provide spot illumination. As a result, as already described using FIG. 1, a narrow range can be specified for pinpoint illumination in the manner indicated by arrows a5, and the door handle body 23 of the inner handle 15, for example, can be directly illuminated.

The illumination device 11 is thus capable of projecting light in different modes to a plurality of areas by a single light source 67 and a single light guide 68 that is not branched between the input end 103 and the output end 107, and different illumination effects can be provided according to the functions of the illumination areas.

In the door lining 25 in which the illumination device 11 is used, the switches of the switch panel 14 are illuminated linearly, i.e., in a wide range, by the linear main light projection part 71, while the door handle body 23 of the inner handle 15 is directly illuminated by the secondary light projection part 72. It is therefore possible to enhance operating properties without providing a plurality of illuminations for the plurality of operating switches 28 and 31 through 33, and the position of the door handle body 23 can also be suitably seen when the inner handle 15 and not the operating switches 26 is operated.

The illumination device of the present invention was described as being employed in the door lining of vehicle in the embodiments, but the illumination device of the present invention can be used in a component other than the door lining of a vehicle.

INDUSTRIAL APPLICABILITY

The illumination device and door lining that uses the illumination device of the present invention are suitable for a vehicle.

LEGEND

11—illumination device;
12—vehicle;

14—switch panel;
15—operating member (inner handle);
21—narrow-ranged illumination area;
23—operating part (door handle body);
25—interior member (door lining);
26—operating switch;
37—vehicle cabin
61—first lens;
63—connection end;
67—light source;
68—light guide;
71—linear main light projection part;
72—secondary light projection part;
73—second lens; and
87—tunnel part

The invention claimed is:

1. An illumination device provided to an interior body of a vehicle, comprising:
a light source;
a light guide for guiding light from the light source and projecting the light within a vehicle cabin,
wherein the light guide comprises:
a linear primary light projection part for projecting the light in linear fashion; and
a secondary light projection part for projecting the light at a distance from the linear primary light projection part using the light passed through the linear primary light projection part; and
a first lens for transmitting the light from the linear primary light projection part and projecting the light in linear fashion, the first lens being disposed linearly along a longitudinal direction of the linear primary light projection part.

2. The illumination device of claim 1, wherein the secondary light projection part is set to irradiate a smaller area than the linear primary light projection part and is disposed farther away from the light source than the linear primary light projection part.

3. The illumination device of claim 1, further comprising:
a second lens for transmitting the light of the secondary light projection part, the second lens having a light projection range smaller than a light projection range of the first lens and being disposed in a concave part formed in the interior body.

4. The illumination device of claim 3, wherein the first lens transmits and projects the light toward an external periphery of the light guide, and the second lens transmits and projects the light in an axial direction of the light guide.

5. The illumination device of claim 1, wherein the linear primary light projection part is directed toward a point of view of a vehicle occupant, and the secondary light projection part is directed away from the point of view of the vehicle occupant.

6. The illumination device of claim 1, wherein the linear primary light projection part is a transparent body having a range that substantially coincides with the entire length of the first lens.

7. The illumination device of claim 1, wherein the first lens has an elongated hallow shape and includes a lens projection part for projecting the light from the linear primary light projection part in a particular direction.

8. The illumination device of claim 1, wherein the first lens further includes a fitting flange and a retaining claw formed continuously with the lens projection part.

9. A door lining comprising:
an illumination device having a linear primary light projection part for projecting light in linear fashion, and a secondary light projection part for projecting light at a distance from the linear primary light projection part using the light passed through the linear primary light projection part, a light guide being provided for guiding light from a light source and projecting the light within a vehicle cabin;
a switch panel disposed in a vicinity of the linear primary light projection part and provided with a plurality of operating switches; and
an operating member disposed in a vicinity of the secondary light projection part and provided with at least one operating part, wherein
the light guide is fastened in a vicinity of a connection end of the switch panel by a first lens for transmitting the light from the linear primary light projection part and projecting the light in linear fashion, the first lens being disposed linearly along a longitudinal direction of the linear primary light projection part.

* * * * *